United States Patent [19]
Adachi et al.

[11] Patent Number: 4,816,690
[45] Date of Patent: *Mar. 28, 1989

[54] METHOD AND APPARATUS FOR RADIATION IMAGE RECORDING AND READ-OUT INCLUDING CONTROL OF READ-OUT IN ACCORDANCE WITH IRRADIATION FIELD DEFINITION

[75] Inventors: Yuuma Adachi; Masamitsu Ishida, both of Kanagawa, Japan

[73] Assignee: Fuji Photo Film Co., Ltd., Kanagawa, Japan

[*] Notice: The portion of the term of this patent subsequent to Mar. 28, 2006 has been disclaimed.

[21] Appl. No.: 676,957

[22] Filed: Nov. 30, 1984

[30] Foreign Application Priority Data

Dec. 2, 1983 [JP] Japan ................................. 58-228163
Dec. 2, 1983 [JP] Japan ................................. 58-228164

[51] Int. Cl.$^4$ ............................................. G01T 1/105
[52] U.S. Cl. ............................... 250/327.2; 250/484.1; 378/150
[58] Field of Search .................... 250/327.2, 484.1; 378/148, 150, 151, 175

[56] References Cited

U.S. PATENT DOCUMENTS

| 4,236,078 | 11/1980 | Kotera et al. | 250/363 R |
| 4,239,968 | 12/1980 | Kotera et al. | 250/327.2 |
| 4,258,264 | 3/1981 | Kotera et al. | 250/484.1 |
| 4,276,473 | 6/1981 | Kato et al. | 250/327.2 |
| 4,315,318 | 2/1982 | Kato et al. | 364/515 |
| 4,346,295 | 8/1982 | Tanaka et al. | 250/327.2 |
| 4,392,239 | 7/1983 | Wilkens | 378/146 |
| 4,527,061 | 7/1985 | Horikawa et al. | 250/327.2 |
| 4,533,947 | 8/1985 | Smith | 358/111 |

Primary Examiner—Janice A. Howell
Assistant Examiner—Constantine Hannaher
Attorney, Agent, or Firm—Sughrue, Mion, Zinn, Macpeak & Seas

[57] ABSTRACT

In a radiation image recording and read-out system, a radiation image is recorded on a stimulable phosphor sheet by use of an irradiation field stop for defining an irradiation field. The stimulable phosphor sheet is then exposed to stimulating rays which cause it to emit light in proportion to the radiation energy stored. The emitted light is photoelectrically detected. The radiation image read-out region of the stimulable phosphor sheet is limited within the irradiation field. When preliminary read-out is conducted prior to final read-out by use of stimulating rays having stimulation energy lower than the stimulation energy of stimulating rays used in the final read-out, the radiation image read-out region in the preliminary read-out is limited within the irradiation field.

11 Claims, 2 Drawing Sheets

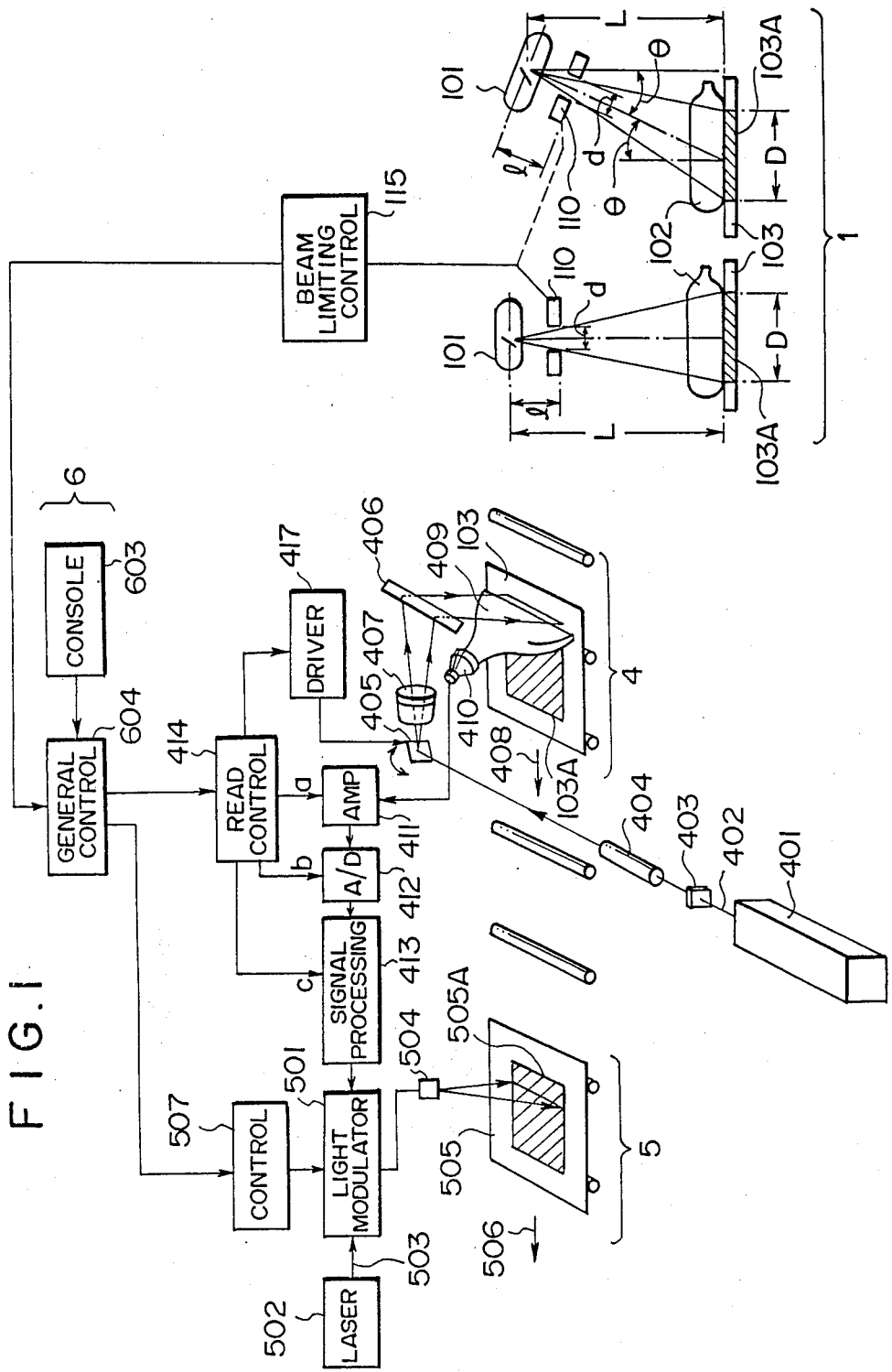

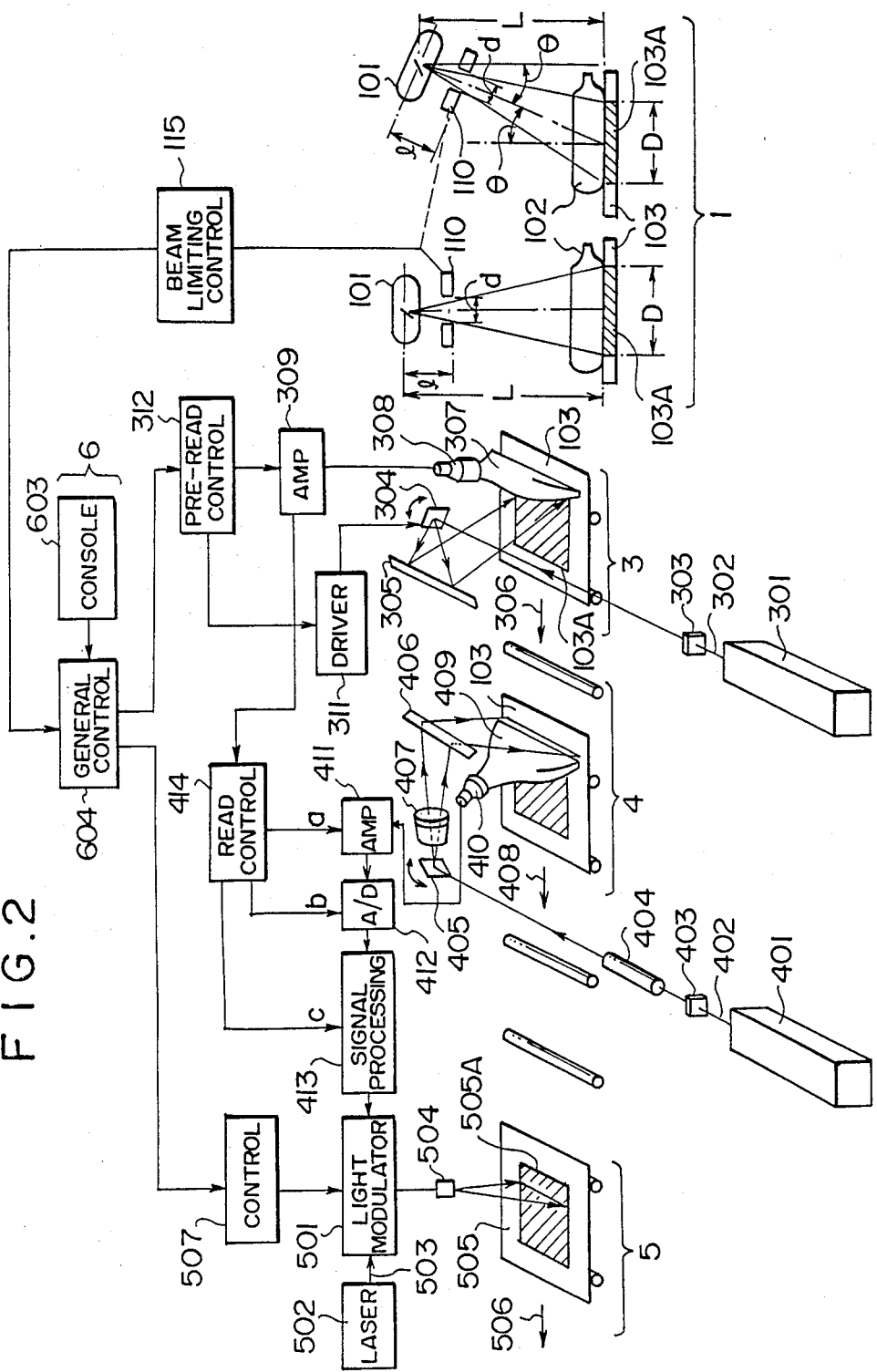

METHOD AND APPARATUS FOR RADIATION IMAGE RECORDING AND READ-OUT INCLUDING CONTROL OF READ-OUT IN ACCORDANCE WITH IRRADIATION FIELD DEFINITION

BACKGROUND OF THE INVENTION

1. Field of the Invention

This invention relates to a radiation image recording and read-out method for exposing a stimulable phosphor sheet carrying a radiation image stored therein to stimulating rays which cause the stimulable phosphor sheet to emit light in proportion to the radiation energy stored, and photoelectrically detecting the emitted light by use of a photodetector, and an apparatus for carrying out the method.

2. Description of the Prior Art

A novel radiation image recording and reproducing system is disclosed, for example, in U.S. Pat. Nos. 4,258,264, 4,276,473 and 4,315,318 and Japanese Unexamined Patent Publication No. 56(1981)-11395. The system comprises (i) exposing a stimulable phosphor sheet to a radiation passing through an object such as the human body to have a radiation image stored therein, (ii) scanning the stimulable phosphor sheet by stimulating rays which cause it to emit light in proportion to the radiation energy stored, (iii) detecting the emitted light and converting it into an electric image signal, and (iv) reproducing a visible image on a recording material such as a photographic material, or on a display device such as a cathode ray tube (CRT) by use of the electric image signal.

As disclosed, for example, in Japanese Unexamined Pat. Publication Nos. 58(1983)-67240, 58(1983)-67242 and 58(1983)-67243, it has also been proposed to embody the aforesaid radiation image recording and reproducing system so that a read-out operation for detecting the image input information of a radiation image stored in a stimulable phosphor sheet (hereinafter referred to as the preliminary read-out) is conducted in advance by use of stimulating rays having stimulation energy of a level lower than the level of the stimulation energy of stimulating rays used in a read-out operation for obtaining a visible image for viewing, particularly for diagnostic purposes (hereinafter referred to as the final read-out), and thereafter the final read-out is carried out. In the final read-out, read-out conditions and/or image processing conditions are adjusted on the basis of the image input information obtained by the preliminary read-out. This method is advantageous in that it is possible to obtain a radiation image having an improved image quality, particularly a high diagnostic efficiency and accuracy.

In X-ray image recording apparatuses, in order to control the object area exposed to X-rays, an irradiation field stop such as a collimator is often positioned near an X-ray source. In the case where the X-ray image recording apparatuses are used for recording an image of the human body for medical diagnosis, since x-rays do harm to the human body, the irradiation field stop is used for preventing portions of the human body that have no bearing on the diagnosis from being exposed to X-rays. Also, the irradiation field stop eliminates the problem that X-rays scattered by object portions outside of the portion required to be viewed, particularly for diagnostic purposes, enter the necessary portion and are recorded in a recording material, thereby deteriorating the contrast and image quality of the X-ray image of the necessary portion.

When an irradiation field stop is used, since only an object portion of which an image should be recorded is exposed to X-rays, deterioration of image quality as described above is prevented. However, when the irradiation field (X-ray exposure field) is limited to a size smaller than the size of the recording material, X-rays scattered by the object portion within the X-ray exposure field are recorded at marginal portions of the recording material outside of the X-ray exposure field. Particularly, when a recording material such as a stimulable phosphor sheet exhibiting a wide latitude is used, noise caused by X-rays thus scattered becomes far more perceptible than when a combination of the conventional film with intensifying screens is used. Noise thus generated adversely affects the marginal portions of the final visible image. Also, in the case of the aforesaid radiation image recording and reproducing system wherein preliminary read-out is conducted prior to final read-out, if noise thus generated is detected at the preliminary read-out step, there arises a very serious problem that erroneous or biased information is given for adjustment of final read-out conditions. These problems do not arise when a stimulable phosphor sheet having a size conforming to the size of the X-ray exposure field is selected and used each time image recording is conducted. However, the operations required for this are troublesome and are not practicable. Particularly, in the case of the radiation image recording and read-out system as described in EP77678A wherein stimulable phosphor sheets having equal, comparatively large sizes are incorporated in the apparatus for conducting the recording and read-out of images of various object portions, the sizes of the stimulable phosphor sheets are not changed during image recording. Therefore, in this case, too, the aforesaid problems must be solved by a different technique.

SUMMARY OF THE INVENTION

The primary object of the present invention is to provide a radiation image recording and read-out method which markedly improves image quality without being adversely affected by noise caused by radiation scattered outside of an irradiation field.

Another object of the present invention is to provide a radiation image recording and read-out method which reduces the read-out time and increases the read-out density.

The specific object of the present invention is to provide a radiation image recording and read-out method which eliminates the necessity of selecting the size of a stimulable phosphor sheet in accordance with the irradiation field each time image recording is conducted.

A further object of the present invention is to provide an apparatus for carrying out the method.

The present invention provides a radiation image recording and read-out method for recording a radiation image in a stimulable phosphor sheet by use of an irradiation field stop, exposing the stimulable phosphor sheet to stimulating rays which cause it to emit light in proportion to the radiation energy stored, and photoelectrically detecting the emitted light, wherein the improvement comprises limiting the radiation image read-out region within the irradiation field used at the step of recording said radiation image in said stimulable phosphor sheet.

The radiation image recording and read-out method of the present invention is carried out by an apparatus comprising a means for limiting the read-out region within the irradiation field on the basis of information on the irradiation field used at the step of radiation image recording.

The above-mentioned read-out may be preliminary read-out, final read-out, or both of them.

In the present invention, since the final read-out region and/or the preliminary read-out region is limited within the irradiation field used at the step of recording a radiation image in a stimulable phosphor sheet by use of an irradiation field stop, a noise component caused by scattered radiation recorded outside of the irradiation field in the stimulable phosphor sheet is not detected. Therefore, it becomes possible to obtain a final visible image having high image quality. In the case where the preliminary readout and the final read-out are conducted, it becomes possible to adjust the final read-out conditions and/or image processing conditions to appropriate conditions regardless of the presence of the scattered radiation, and to obtain a final visible image of high image quality. Also, since the read-out region is limited, it becomes possible to reduce the read-out time or to increase the read-out density. Further, since these effects are achieved, it becomes unnecessary to select the size of the stimulable phosphor sheet in accordance with the size of the irradiation field each time image recording is conducted. Accordingly, marked improvement in image quality can be achieved particularly in a system for conducting image recording and read-out by incorporating stimulable phosphor sheets having equal, comparatively large sizes in the apparatus.

BRIEF DESCRIPTION OF THE DRAWINGS

FIG. 1 is a schematic view showing a radiation image recording and reproducing system wherein an embodiment of the radiation image recording and read-out apparatus in accordance with the present invention is employed, and FIG. 2 is a schematic view showing a radiation image recording and reproducing system wherein another embodiment of the radiation image recording and read-out apparatus in accordance with the present invention is employed.

DESCRIPTION OF THE PREFERRED EMBODIMENTS

The present invention will hereinbelow be described in further detail with reference to the accompanying drawings.

FIG. 1 schematically shows a radiation image recording and reproducing system in which an embodiment of the radiation image recording and read-out apparatus in accordance with the present invention is employed, and which comprises a recording section 1, a read-out section 4, an image reproducing section 5, and a general control section 6.

In the recording section 1, the exposure field of X-rays emitted by an X-ray source 101 toward an object 102 is limited by an irradiation field stop 110 such as a collimator. The X-rays then pass through the object 102 and are absorbed into a stimulable phosphor sheet 103 to have an X-ray image of the object 102 stored therein. The irradiation field stop 110 is adjusted by an irradiation field stop control unit 115 so that an X-ray exposure field 103A as indicated by hatching is formed in the stimulable phosphor sheet 103. The irradiation field stop control unit 115 outputs and forwards to a general control unit 604 information on the aperture size d of the irradiation field stop 110, the distance l between the X-ray source 101 and the irradiation field stop 110, the distance L between the X-ray source 101 and the stimulable phosphor sheet 103, and the angle $\theta$ of the X-ray source 101 with respect to the stimulable phosphor sheet 103 (i.e. the angle between a line normal to the stimulable phosphor sheet 103, which passes through the focal point of the X-ray source 101, and a line connecting the focal point of the X-ray source 101 with the center of the aperture of the irradiation field stop 110) in the case where X-rays are emitted to obliquely impinge upon the stimulable phosphor sheet 103. By the term "aperture size" of the irradiation field stop 110 is meant the diameter of the aperture when the aperture is circular or the length of the side or the diagonal line of the aperture when the aperture is rectangular. On the basis of the information given by the irradiation field stop control unit 115, the general control unit 604 calculates the size D of the X-ray exposure field 103A. When the X-ray source 101 is not inclined with respect to the stimulable phosphor sheet 103, the size D of the X-ray exposure field 103A is calculated by $$D = \frac{dL}{l}$$

When the X-ray source 101 is inclined with respect to the stimulable phosphor sheet 103 so that X-rays obliquely impinge upon the sheet 103, the size D of the X-ray exposure field 103A is calculated by $$D = \frac{dL}{l} \times \frac{1 \times \tan^2\theta}{1 - \left(\frac{d}{2l}\right)^2 \tan^2\theta}.$$

It is also possible to conduct the calculation of the size D of the X-ray exposure field 103A by the irradiation field stop control unit 115 and to output the calculated result to the general control unit 604.

In the embodiment of FIG. 1, the position of the stimulable phosphor sheet 103 with respect to the X-ray source 101 is fixed in advance, for example, by aligning the center of the stimulable phosphor sheet 103 with a line passing through the center of the X-ray source 101. Therefore, when the size D of the X-ray exposure field 103A is fixed, the position of the X-ray exposure field 103A in the stimulable phosphor sheet 103 can be determined from the size D (that is, information on the position of the X-ray exposure field 103A is included in the information on the size D of the X-ray exposure field 103A). On the other hand, when the position of the stimulable phosphor sheet 103 with respect to the X-ray source 101 is not fixed in advance, the position is detected at the recording section 1 and a signal representing the position is sent to a read-out control unit 414 via the general control unit 604.

The recording section 1 may be fabricated independently of the read-out section 4 or may be fabricated integrally therewith.

In the read-out section 4, a laser beam 402 emitted by a laser beam source 401 is passed through a filter 403 for cutting off light having a wavelength within the range of the wavelength of the light emitted by the stimulable phosphor sheet 103 upon stimulation thereof by the laser beam 402. Then, the beam diameter of the laser beam 402 is strictly adjusted by a beam expander 404. The laser beam 402 is then deflected by a light deflector 405 formed of a galvanometer mirror or the like, and is made to impinge upon the stimulable phosphor sheet 103 by a plane reflection mirror 406. Between the light deflector 405 and the plane reflection mirror 406 is positioned an fθ lens 407 for maintaining the beam diameter of the laser beam 402 uniform during the scanning of the laser beam 402 on the stimulable phosphor sheet 103. While the laser beam 402 impinges upon the stimulable phosphor sheet 103, the stimulable phosphor sheet 103 is moved in the direction as indicated by the arrow 408 (i.e. sub-scanning direction) and, consequently, the whole area of the stimulable phosphor sheet 103 is exposed to and scanned by the laser beam 402. Upon exposure to the laser beam 402, the stimulable phosphor sheet 103 emits light in proportion to the X-ray energy stored therein, and the light emitted enters a light guide member 409. The light guide member 409 has a linear light input face positioned close to the scanning line on the stimulable phosphor sheet 103, and a ring-shaped light output face in close contact with the light receiving face of a photodetector 410, which may be a photomultiplier. The light guide member 409 is fabricated of a transparent thermoplastic resin sheet such as an acrylic resin sheet so that the light entering from the light input face can be effectively transmitted to the light output face by total reflection through the interior of the light guide member 409. The light emitted by the stimulable phosphor sheet 103 upon stimulation thereof is guided inside of the light guide member 409, emitted from the light output face of the light guide member 409 and received by the photodetector 410. The light guide member 409 may be of a shape and a material as disclosed in U.S. Pat. No. 4,346,295. The light receiving face of the photodetector 410 is provided with a filter for transmitting only the light having the wavelength distribution of the light emitted by the stimulable phosphor sheet 103 and cutting off the light having the wavelength distribution of the stimulating rays, so that the photodetector 410 can detect only the light emitted by the stimulable phosphor sheet 103 upon stimulation thereof.

In order to limit the image read-out region within the X-ray exposure field 103A in the stimulable phosphor sheet 103, scanning is conducted as described below. The read-out control unit 414 generates turning-on and turning-off signals for driving a light deflector driver 417 as long as the X-ray exposure field 103A is present on a scanning line in the main scanning direction, and an amplitude signal for limiting the amplitude of scanning in the main scanning direction to the length of the X-ray exposure field 103A in the width direction thereof. These signals are generated on the basis of the information on the size D of the X-ray exposure field 103A including the information on the position thereof, or the information on the position and the size D of the X-ray exposure field 103A, which is sent from the general control unit 604. The signals thus generated are sent from the readout control unit 414 to the light deflector driver 417. When the X-ray exposure field 103A is not present on the scanning line in the main scanning direction, the light deflector 405 is maintained stationary at a position for reflecting the laser beam 402 so that it does not impinge upon the stimulable phosphor sheet 103. When the turning-on signal is sent to the light deflector driver 417, the light deflector 405 is operated so that the stimulable phosphor sheet 103 is scanned by the laser beam 402 over an amplitude designated by the amplitude signal. The scanning is finished when the turning-off signal is sent to the light deflector driver 417. In this manner, the stimulable phosphor sheet 103 is exposed to the laser beam 402 only inside of the X-ray exposure field 103A. In this embodiment, the light deflector driver 417 is controlled to limit the read-out region in the main scanning direction within the X-ray exposure field 103A. However, it is also possible to position a shutter on the optical path of the laser beam 402 and to open the shutter only when the X-ray exposure field 103A is present on the scanning line in the main scanning direction.

In the method and apparatus of the present invention, in order to improve the signal-to-noise ratio, it is preferable that the stimulable phosphor emits light having a wavelength range not overlapping the range of wavelength of the stimulating rays employed to excite the stimulable phosphor. Preferably, when a stimulating ray source which emits stimulating rays having a wavelength within the range between 600 nm and 700 nm is used, a stimulable phosphor which emits light having a wavelength within the range between 300 nm and 500 nm should be selected, as disclosed in U.S. Pat. No. 4,258,264.

As the stimulable phosphor, for example, rare earth activated alkaline earth metal fluorohalide phosphor is preferred. One example of this phosphor is, as shown in DE-OS No. 2,928,245, a phosphor represented by the formula $(Ba_{1-x-y},Mg_x,Ca_y)FX:aEu^{2+}$ wherein X is at least one of Cl and Br, x and y are numbers satisfying $0<x+y\leq0.6$ and $xy\neq0$, and a is a number satisfying $10^{-6}\leq a \leq 5\times10^{-2}$. Another example of this phosphor is, as shown in U.S. Pat. No. 4,239,968, a phosphor represented by the formula $(Ba_{1-x},M^{II}_x)FX:yA$ wherein $M^{II}$ is at least one of Mg, Ca, Sr, Zn and Cd, X is at least one of Cl, Br and I, A is at least one of Eu, Tb, Ce, Tm, Dy, Pr, Ho, Nd, Yb and Er, x is a number satisfying $0\leq x\leq0.6$, and y is a number satisfying $0\leq y\leq0.2$. Further, as the stimulable phosphor to be used in this invention can be used ZnS:Cu,Pb; $BaO \cdot xAl_2O_3$:Eu wherein $0.8\leq x\leq10$; and $M^{II}O \cdot xSiO_2$:A wherein $M^{II}$ is Mg, Ca, Sr, Zn, Cd or Ba, A is Ce, Tb, Eu, Tm, Pb, Tl, Bi or Mn, and x is number satisfying $0.5\leq x\leq2.5$, as shown in U.S. Pat. No. 4,236,078. Furthermore, as the stimulable phosphor can be used LnOX:xA wherein Ln is at least one of La, Y, Gd and Lu, X is at least one of Cl and Br, A is at least one of Ce and Tb, x is a number satisfying $0<x<0.1$, as shown in U.S. Pat. No. 4,236,078. Among the above enumerated phosphors, the rare earth activated alkaline earth metal fluorohalide phosphors are the most preferable among which barium fluorohalides are the most preferable in view of the high intensity of emission of light.

Further, barium fluorohalide phosphors added with a metal fluoride as disclosed in European Patent Publication No. 21,342, or barium fluorohalide phosphors added with at least one of a metal chloride, a metal bromide and a metal iodide as disclosed in European Publication No. 29,963 are also preferable because of their improved light emitting characteristics.

It is also desirable to color the phosphor layer of the stimulable phosphor sheet made of the above phosphor by use of pigments or dyes to improve the sharpness of the image obtained thereby as disclosed in European Patent Publication No. 21,174.

The light emitted by the stimulable phosphor sheet 103 and detected by the photodetector 410 is converted into an electric signal, amplified to an appropriate level by an amplifier 411 the sensitivity of which has been adjusted by a amplification degree setting value (a), and then sent to an A/D converter 412. In the A/D converter 412, the electric signal is converted into a digital signal by use of a scale factor which has been set by a scale factor setting value (b) to suit the width of signal fluctuation. The digital signal thus obtained is sent to a signal processing circuit 413, in which it is processed on the basis of an image processing condition setting value (c) so as to obtain an X-ray image suitable for viewing, particularly for diagnostic purposes. The electric image signal obtained by the signal processing circuit 413 is sent to a light modulator 501 at the image reproducing section 5.

In the image reproducing section 5, a laser beam 503 emitted by a reproducing laser beam source 502 is modulated by the light modulator 501 on the basis of the electric image signal, and is made to impinge upon a photosensitive material 505 such as a photographic film by a scanning mirror 504 for scanning the photosensitive material 505 by the laser beam 503. At this time, the photosensitive material 505 is moved normal to the scanning direction, i.e. in the direction as indicated by the arrow 506. Accordingly, the X-ray image is recorded on the photosensitive material 505.

In this embodiment, a light modulator control unit 507 is used to output the electric image signals so that an image reproducing region 505A is formed on the photosensitive material 505 on the basis of the information on the size of the X-ray exposure field 103A (including the information on the position of the X-ray exposure field 103A) or the information on the size and position of the X-ray exposure field 103A, which is sent from the general control unit 604. In this manner, only the image inside of the X-ray exposure field 103A is reproduced to obtain a sharper final visible image.

The general control section 6 comprises the general control unit 604 and a console 603, and is used to calculate the size of the X-ray exposure field 103A including the information on the position thereof or to calculate the size and position of the X-ray exposure field 103A, and to adjust the read-out density, the read-out speed, the amplification degree setting value (a), the scale factor setting value (b), the image processing condition setting value (c), and the like.

FIG. 2 schematically shows the radiation image recording and reproducing system in which another embodiment of the radiation image recording and read-out apparatus in accordance with the present invention is employed, and which comprises a recording section 1, a preliminary read-out section 3, a final read-out section 4, an image reproducing section 5, and a general control section 6. In FIG. 2, similar elements are numbered with the same reference numerals with respect to FIG. 1.

In the recording section 1, image recording is conducted in the same manner as in the embodiment of FIG. 1. When the position of the stimulable phosphor sheet 103 with respect to the X-ray source 101 is not fixed in advance, a signal representing the position is sent to a preliminary read-out control unit 312 via the general control unit 604. The recording section 1 may be fabricated independently of the preliminary read-out section 3 and the final read-out 4 or may be fabricated integrally therewith.

In the preliminary read-out section 3, a laser beam 302 emitted by a laser beam source 301 is first passed through a filter 303 for cutting off light having a wavelength within the range of the wavelength of the light emitted by the stimulable phosphor sheet 103 upon stimulation thereof by the laser beam 302. Then the laser beam 302 is one-dimensionally deflected by a light deflector 304 such as a galvanometer mirror and directed onto the stimulable phosphor sheet 103 by a plane reflection mirror 305. While the laser beam 302 impinges upon the stimulable phosphor sheet 103, the stimulable phosphor sheet 103 is moved in the direction as indicated by the arrow 306 (i.e. the sub-scanning direction).

The image read-out region in the preliminary read-out is limited within the X-ray exposure field 103A in the stimulable phosphor sheet 103 in the same manner as described with reference to FIG. 1, except that the information is sent from the general control unit 604 to the preliminary read-out control unit 312 which generates the signals for controlling the operation of a light deflector driver 311 for driving a light deflector 304 on the basis of the information sent from the general control unit 604. That is, the preliminary read-out control unit 312 controls the light deflector driver 311 to limit the image read-out region in the same manner as the read-out control unit 414 controls the light deflector driver 417 in FIG. 1.

In the preliminary read-out section 3, the power of the laser beam source 301, the beam diameter of the laser beam 302, the scanning speed of the laser beam 302, and the moving speed of the stimulable phosphor sheet 103 are selected so that the stimulation energy of the laser beam 302 for preliminary read-out is smaller than the stimulation energy of the laser beam for final read-out.

The "stimulation energy" referred to in this invention means the effective energy of the stimulating rays which the stimulable phosphor sheet receives per unit area.

In the present invention, the stimulation energy of the stimulating rays applied to the stimulable phosphor sheet in the preliminary read-out should be lower than the stimulation energy of the stimulating rays used in the final read-out. As the ratio of the stimulation energy of the stimulating rays in the preliminary read-out to the stimulation energy of the stimulating rays in the final readout increases, the amount of radiation energy remaining in the stimulable phosphor sheet after the preliminary read-out decreases. It has been found that, when the aforesaid ratio is smaller than one, it is possible to obtain a radiation image suitable for viewing, particularly for diagnostic purposes, by adjusting the read-out gain to an appropriate value. However, in order to obtain a radiation image having an improved image quality, particularly a high diagnostic efficiency and accuracy, the aforesaid ratio should preferably be as small as possible insofar as the image input information of the radiation image stored in the stimulable phosphor sheet can be detected sufficiently to permit adjustment of the readout conditions or the image processing conditions, that is, insofar as the light emitted by the stimulable phosphor sheet in the preliminary read-out can be detected sufficiently for the above-mentioned purposes. Thus, the aforesaid stimulation energy ratio should generally be 50% or less, preferably 10% or less, more preferably 3% or less. The lower limit of this ratio is determined according to the accuracy of the system for detecting the light emitted by the stimulable phosphor sheet in the preliminary read-out.

In order to make the stimulation energy of the stimulating rays in the preliminary read-out smaller than the stimulation energy of the stimulating rays in the final readout, it is possible to use any known method. For example, the output level of the laser beam source used in the preliminary read-out may be decreased, the beam diameter of the laser beam may be increased, the scanning speed of the laser beam may be increased, or the moving speed of the stimulable phosphor sheet may be increased.

When exposed to the laser beam 302, the stimulable phosphor sheet 103 emits light in proportion to the X-ray energy stored therein, and the emitted light enters a light guide member 307 which is made of the same material and has the same configuration as those of the light guide member 409 in FIG. 1. The light emitted by the stimulable phosphor sheet 103 is guided inside of the light guide member 307 through total reflection, emitted from the light output face of the light guide member 307 and received by a photodetector 308.

The light receiving face of the photodetector 308 is closely contacted with a filter for transmitting only light having the wavelength distribution of the light emitted by the stimulable phosphor sheet 103 and cutting off the light having the wavelength distribution of the stimulating rays, so that the photodetector 308 can detect only the light emitted by the stimulable phosphor sheet 103 upon stimulation thereof. The output of the photodetector 308 is amplified by an amplifier 309 and sent to a control circuit 414 of the final read-out section 4. On the basis of the image input information thus obtained, the control circuit 414 calculates an amplification degree setting value (a), a scale factor setting value (b) and an image processing condition setting value (c). After the preliminary read-out is finished, the stimulable phosphor sheet 103 is sent to the final read-out section 4.

In the final read-out section 4, image read-out is conducted in the same manner as described with reference to FIG. 1. The final read-out may be conducted over the whole surface of the stimulable phosphor sheet 103. However, the same method and means as those for the aforesaid preliminary read-out should preferably be used to limit the read-out region within the X-ray exposure field. Or, the information on the X-ray exposure field, i.e. the information on the size of the X-ray exposure field including the information on the position of the X-ray exposure field, or the information on the size and position of the X-ray exposure field should be sent from the general control unit 604 to the signal processing circuit 413, thereby processing the image signals only within the X-ray exposure field on the basis of the information. In this case, it becomes possible to shorten the final read-out time and/or the image processing time. In the case where the same means as that for the aforesaid preliminary read-out is used to limit the read-out region within the X-ray exposure field, by increasing the read-out density in accordance with the characteristics of the image recorded within the X-ray exposure field, it becomes possible to obtain image signals achieving higher image quality within a time equal to or shorter than the time required when the whole surface of the stimulable phosphor sheet 103 is scanned.

The light emitted by the stimulable phosphor sheet 103 and detected by the photodetector 410 is converted into an electric signal, which is processed and used to reproduce the X-ray image in the same manner as described with reference to FIG. 1.

In FIG. 2, the general control unit 604 is used to calculate the size of the X-ray exposure field 103A including the information on the position thereof or to calculate the size and position of the X-ray exposure field 103A, and to adjust the read-out density, the read-out speed, or the like.

It should be understood that the present invention can be embodied in various ways other than the above described embodiments. For instance, as disclosed in Japanese Unexamined Patent Publication No. 58(1983)-89244, a desensitizing section may be positioned between the recording section and the read-out section or the preliminary read-out section.

Also, as disclosed in Japanese Unexamined Patent Publication No. 58(1983)-67243, a single read-out apparatus may be used for conducting the preliminary read-out and the final read-out by changing the scanning conditions of the stimulating rays, or the like.

It is also possible to replace the laser beam sources 301 and 401 for emitting the stimulating rays by LED arrays having a wavelength range different from that of the light emitted by the stimulable phosphor sheet upon stimulation thereof. In this case, the light deflectors 304 and 405 may be omitted.

Further, instead of the photodetectors 308 and 410 provided with the light guide members 307 and 409 respectively, it is also possible to use a linear sensor comprising a plurality of photomultipliers or phototransistors positioned along a straight line in the main scanning direction.

Also, for reproducing the radiation image at the image reproducing section 5, it is also possible to use any other method. For example, the radiation image may be displayed on a CRT or recorded by use of a video printer.

We claim:

1. A radiation image recording and read-out method for recording a radiation image on a stimulable phosphor sheet by use of an irradiation field stop, exposing the stimulable phosphor sheet to stimulating rays which cause it to emit light in proportion to the radiation energy stored, and photo-electrically detecting the emitted light, wherein the improvement comprises the steps of defining an irradiation field in accordance with an aperture size of said irradiation field stop, a distance between a source of said stimulating rays and said irradiation field stop, and a distance between said stimulable phosphor sheet and said stimulating ray source, and limiting a radiation image read-out region within said irradiation field used at the step of recording said radiation image in said stimulable phosphor sheet in accordance with said defining step.

2. A method as defined in claim 1 wherein, when source for emitting a radiation onto said stimulable phosphor sheet is not inclined with respect to said stimulable phosphor sheet, the size D of said radiation exposure field is calculated by $$D = \frac{dL}{l}$$

wherein d denotes the aperture size of said irradiation field stop, l denotes the distance between the radiation source and said irradiation field stop, and L denotes the distance between the radiation source and said stimulable phosphor sheet.

3. A method as defined in claim 1 wherein, when a source for emitting a radiation to said stimulable phosphor sheet is inclinable with respect to said stimulable phosphor sheet, the size D of said radiation exposure field is calculated by $$D = \frac{dL}{l} \times \frac{1 + \tan^2\theta}{1 - \left(\frac{d}{2l}\right) \times \tan^2\theta}$$

wherein d denotes the aperture size of said irradiation field stop, denotes the distance between the radiation source and said irradiation field stop, L denotes the distance between the radiation source and said stimulable phosphor sheet, and denotes the angle between a line normal to said stimulable phosphor sheet, which passes through the focal point of the radiation source, and a line connecting the focal point of the radiation source with the center of the aperture of said irradiation field stop.

4. A method as defined in claim 2 or 3 wherein the position of said stimulable phosphor sheet with respect to said radiation source is fixed in advance.

5. A method as defined in claim 1 wherein said radiation image read-out region is limited within said irradiation field by controlling the operation of a light deflector used for deflecting said stimulating rays so that said stimulable phosphor sheet is scanned by said stimulating rays.

6. A method as defined in claim 1 wherein said read-out is preliminary read-out.

7. A method as defined in claim 1 wherein said read-out is final read-out.

8. A method as defined in claim 1 wherein said read-out is both preliminary read-out and final read-out.

9. A radiation image recording and read-out apparatus comprising a recording section provided with an irradiation field stop for recording a radiation image in a stimulable phosphor sheet, and a read-out section for exposing the stimulable phosphor sheet to emit light in proportion to the radiation energy stored and photo-electrically detecting the emitted light,
wherein the improvement comprises means for limiting a radiation image read-out region within an irradiation field used at the step of recording said radiation image in said stimulable phosphor sheet at said recording section on the basis of information on said irradiation field, said limiting means including means for defining said irradiation field in accordance with an aperture size of said irradiation field stop, a distance between a source of said stimulating rays and said irradiation field stop, and a distance between said stimulating ray source and said stimulable phosphor sheet.

10. A radiation image recording and read-out method for recording a radiation image on a stimulable phosphor sheet by use of an irradiation field stop, exposing the stimulable phosphor sheet to stimulating rays which cause it to emit light in proportion to the radiation energy stored, and photo-electrically detecting the emitted light,
wherein the improvement comprises the step of limiting the radiation image read-out region within an irradiation field used at the step of recording said radiation image in said stimulable phosphor sheet, wherein said limiting step comprises a preliminary read-out step and a final read-out step, said preliminary read-out step being performed only within said radiation image read-out region, so as to determine read-out conditions for said final read-out step.

11. A radiation image recording and read-out apparatus comprising means for recording a radiation image on a stimulable phosphor sheet by use of an irradiation field stop, and read-out means for exposing the stimulable phosphor sheet to stimulating rays which cause it to emit light in proportion to the radiation energy stored, and for photo-electrically detecting the emitted light,
wherein the improvement comprises means for limiting a radiation image read-out region within an irradiation field used at the step of recording said radiation image in said stimulable phosphor sheet at said recording section on the basis of information in said irradiation field, and
wherein said read-out means comprises a preliminary read-out section and a final read-out section, said limiting means causing read-out to be performed within said preliminary read-out section only within said irradiation field, so as to determine performance of read-out by said final read-out section.

* * * * *